US006993096B1

(12) United States Patent
Shiraishi et al.

(10) Patent No.: US 6,993,096 B1
(45) Date of Patent: Jan. 31, 2006

(54) BS DIGITAL BROADCASTING RECEIVER

(75) Inventors: Kenichi Shiraishi, Yokohama (JP);
Akihiro Horii, Zama (JP); Shoji Matsuda, Kawasaki (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/959,267

(22) PCT Filed: Apr. 4, 2000

(86) PCT No.: PCT/JP00/02663

§ 371 (c)(1),
(2), (4) Date: Oct. 22, 2001

(87) PCT Pub. No.: WO00/65794

PCT Pub. Date: Nov. 2, 2000

(30) Foreign Application Priority Data

Apr. 23, 1999 (JP) .................................. 11-116994

(51) Int. Cl.
*H03D 3/22* (2006.01)
*H04L 27/22* (2006.01)
(52) U.S. Cl. ...................... 375/329; 375/279; 329/304
(58) Field of Classification Search ............... 375/260, 375/326, 279, 329, 331, 281, 324; 329/304
See application file for complete search history.

(56) References Cited

U.S. PATENT DOCUMENTS

| 4,856,027 A | | 8/1989 | Nakamura et al. |
| 5,764,690 A | * | 6/1998 | Blanchard et al. .......... 375/147 |
| 5,903,546 A | | 5/1999 | Ikeda et al. |
| 6,177,835 B1 | * | 1/2001 | Grebowsky et al. ........ 329/304 |
| 6,678,336 B1 | * | 1/2004 | Katoh et al. ................. 375/316 |

FOREIGN PATENT DOCUMENTS

| EP | 0 732 832 A1 | 9/1996 |
| JP | 07-143185 | 6/1995 |
| WO | WO 99/29075 | 6/1999 |

OTHER PUBLICATIONS

Supplementary Partial European Search Report, Nov. 27, 2002.
Supplementary European Search Report, Feb. 19, 2003.
Combarel et al., "HD-SAT Modems for the Satellite Broadcasting in the 20 GHz Frequency Band," 8087 IEEE Transactions on Consumer Electronics, 41 (Nov. 1995), No. 4, New York, US, pp. 991-999.
Sundberg et al., "Hybrid Trellis-Coded 8/4-PSK Modulation Systems," 8089 IEEE Transactions on Communications 38 (May 1990), No. 5, New York, US, pp. 602-613.
International Search Report dated Jul. 21, 2000.

* cited by examiner

*Primary Examiner*—Temesghen Ghebretinsae
(74) *Attorney, Agent, or Firm*—Eric J. Robinson; Robinson Intellectual Property Law Office, P.C.

(57) ABSTRACT

A BS digital broadcasting receiver which eliminates the uncertainty of an ODU's phase noise-dependent switching point when switching a receiving system. The receiver is provided with a demodulator circuit (6A) having a carrier regenerating circuit (19A) based on demodulation data in a BPSK modulation section, and with a demodulator circuit (6B) having a carrier regenerating circuit (19B) based on demodulation data in each time-division modulation section, wherein, when a lock for carriers regenerated by the carrier regenerating circuit (19A) is maintained and carriers regenerated by the carrier regenerating circuit (19B) is locked, demodulation data, in the BPSK demodulation section and a QPSK demodulation section, output from the demodulator circuit (6A) and 8-PSK-modulated demodulation data output from the demodulator circuit (6B) are selected by a selector (7) for outputting.

14 Claims, 13 Drawing Sheets

BS DIGITAL BROADCASTING RECEIVER

TECHNICAL FIELD

The present invention relates to a BS digital broadcasting receiver for receiving a BS digital signal wherein a signal modulated by a hierarchical transmission system typically represented by a BS digital broadcasting receiver for receiving a BS digital TV broadcasting is time-division-multiplexed.

BACKGROUND ART

A BS digital broadcasting adopts a hierarchical modulation system and a system called burst symbol insertion that allows reception at a low CNR. A main signal is sent by frame and through time division multiplexing by using one or more modulation systems of 8PSK modulation, QPSK modulation and BPSK modulation. A burst symbol (BS) and a TMCC signal are BPSK-modulated.

As publicly known, one frame in the hierarchical transmission system is comprised of 39,936 symbols by inserting burst symbols (BS) among the TMCC signals, 8PSK main signals, . . . , QPSK main signals and the main signals as shown in FIG. 11A.

As shown in FIG. 12, a BS digital broadcasting receiver operates to convert received signals into intermediate frequency signals, perform on a complex operation circuit 11 a complex operation on I and Q signals acquired by orthogonally detecting the intermediate frequency signals by a quasi-synchronous detection system so as to demodulate them, and pass them through a roll-off filter 12 comprised of a FIR filter to convert them into symbol streams on a thinning circuit 13.

From demodulation data DI and DQ outputted from the thinning circuit 13, frame synchronization pattern detection, carrier regeneration, absolute phasing and TMCC decoding are sequentially performed as mentioned later, and a carrier regeneration phase error table according to a modulation system based on modulation system identifying signals comprised of A0 and A1 signals for the sake of identifying sections of an 8PSK modulation wave, a QPSK modulation wave and a BPSK modulation wave respectively is selected, and the demodulation data DI and DQ are received and supplied to a phase error detection circuit 15 constituting a phase comparator for detecting a phase error, from which circuit a phase error voltage required for carrier regeneration is acquired and supplied to a loop filter 17 so as to acquire a tuning voltage.

The tuning voltage outputted from a loop filter 17 is supplied to a numerical control frequency oscillator 18 from which data of $\sin\omega t$ and data of $\cos\omega t$ based on the tuning voltage is outputted from the numerical control frequency oscillator 18 so as to perform the carrier regeneration. To be more specific, the following complex operation is performed by using $\sin\omega t$ and $\cos\omega t$, namely the output of the numerical control frequency oscillator 18 and orthogonal detection output I and Q so as to consequently acquire demodulation data DI and DQ.

$$\begin{pmatrix} DI \\ DQ \end{pmatrix} = \begin{pmatrix} \cos\check{\eta}t & \sin\check{\eta}t \\ -\sin\check{\eta}t & \cos\check{\eta}t \end{pmatrix} \begin{pmatrix} I \\ Q \end{pmatrix}$$

The demodulation data DI and DQ are supplied to an absolute phasing circuit 14 to be absolutely phased so as to match the phases to a sending end. The absolutely phased demodulation data ADI and ADQ signals are supplied to a W1 detection circuit 2 so as to detect a frame synchronization pattern (W1) from the demodulation data ADI and ADQ. The demodulation data for which frame timing is established based on the frame synchronization pattern detected on the W1 detection circuit 2 is supplied to a decoder division 3 to be decoded.

If the frame timing is established by detecting the frame synchronization pattern, time-series positions of the frame synchronization pattern, TMCC signals, a super frame identification pattern and burst symbols are found respectively and decoded in a decoding division 3. The TMCC signals outputted from the decoding division 3 are supplied to a TMCC decoding division to be decoded. A switching instruction signal based on the frame synchronization pattern detected on the W1 detection circuit 2 and a receiving CNR (when the CNR exceeds a predetermined value, it becomes "H") outputted from the decoding division 3 and the decoded TMCC signals are supplied to a timing generating circuit 5 from which the modulation system identifying signals comprised of the A0 and A1 signals and a burst enable signal (BRTEN) indicating that a carrier regeneration division will be a burst symbol division are sent.

The A1, A0, switching instruction and BRTEN signals are as shown in FIG. 11 B, C, D and E. Moreover, in FIG. 12, a reference number 16 indicates a data processing circuit performing an AFC action. And a phase error detection circuit 15, the loop filter 17, the numerical control frequency oscillator 18 and the data processing circuit 16 are combined to constitute a carrier regenerating circuit 19 as a whole.

In the above conventional BS digital broadcasting receiver, one demodulator circuit 1 is used so that, in receiving operation when the CNR is high, the carrier regeneration is performed by performing phase error detection based on all the modulation systems (continuous reception). In addition, in the receiving operation when the CNR is low, the carrier regeneration is performed by burst-receiving a BPSK-modulated signal (burst reception).

Burst reception can be implemented, if mentioned in detail, by performing operation such as holding the output of the loop filter 17 on the carrier regenerating circuit 19. The BPSK-modulated signal is burst-received in the receiving operation when the CNR is low, so that the carrier regeneration is performed by using the phase error of the section.

However, there has been a problem that, in the case where performance of a down converter of an outdoor unit (ODU) or the like including an antenna is insufficient, reception with little fixed deterioration is difficult when performing the burst reception compared with the continuous reception due to influence of its phase noise.

For instance, if the BS digital broadcasting receiver receives the 8PSK, QPSK and BPSK modulation waves at a high CNR, it performs the continuous reception so as to implement the carrier regeneration. Here, if receiving situation changes and the CNR lowers, it becomes difficult for the BS digital broadcasting receiver to receive the 8PSK modulation wave and implement the carrier regeneration so that it performs the burst reception to implement the carrier regeneration except the 8PSK modulation section based on the switching instruction signal (see FIG. 11D). A determination of the switching is made by monitoring an error rate after trellis decoding and so on, and the switching is set on the BS digital broadcasting receiver so that it is switched at an arbitrary value.

In the case of considering the carrier regeneration around the switching between a high CNR and an intermediate CNR, the marginal CNR when performing the continuous reception is different from the marginal CNR when performing the burst reception (see FIG. 3). This point will be described based on FIG. 13 hereafter.

FIG. 13 is a diagram of which horizontal axis is phase noise and vertical axis is the marginal CNR, wherein (a) is the marginal CNR acquired from a bit error rate at 8PSK modulation reception when the carrier regeneration is performed by the continuous reception, (b) is the marginal CNR acquired from a bit error rate at 8PSK modulation reception when the carrier regeneration is performed by the burst reception performed by the demodulation data of the BPSK modulation section, (d) is the marginal CNR acquired from a bit error rate at QPSK modulation reception when the carrier regeneration is performed by the continuous reception (except the 8PSK modulation section), (e) is the marginal CNR acquired from a bit error rate at QPSK modulation reception when the carrier regeneration is performed by the burst reception performed by the demodulation data of the BPSK modulation section. Here, the marginal CNR is a limit value wherein any CNR lower than it cannot be corrected in connected sign error correction.

For instance, when the phase noise θ rms is 10 (deg), a switching point from the continuous (BPSK, QPSK and 8PSK modulation sections) reception to the burst reception is calculated at 9.5 dB (see FIG. 13 (a)) on a shift from high CNR reception to intermediate high CNR reception, and a switching point from the burst reception to the continuous reception is calculated at 13 dB (see FIG. 13 (b)) on a shift from the intermediate high CNR reception to the high CNR reception. Thus, there is hysteresis between mutual switching points of the continuous reception and the burst reception (shown by an arrow (c) in FIG. 13 for instance), and there further arises a problem that a factor of this hysteresis occurrence depends on the phase noise of the ODU. If phase noise characteristics of the ODU are known in advance, technical countermeasures can be taken, whereas it is actually impossible to predict the characteristics since the ODUs purchased by users are various. In order to solve this, it is also thinkable to detect a degree of the ODU phase noise, which is by no means easy.

In addition, when the phase noise θ rms is 10 (deg) likewise for instance, a switching point from the continuous (QPSK and 8PSK modulation sections) reception to the burst reception is calculated at 3.5 dB (see FIG. 13 (d)) on a shift from low CNR reception to intermediate low CNR reception, and a switching point from the burst reception to the continuous reception is calculated at 4 dB (see FIG. 13 (e)) on a shift from the intermediate low CNR reception to the low CNR reception. Thus, there is hysteresis between mutual switching points of the continuous reception and the burst reception (shown by an arrow (f) in FIG. 13 for instance), and there further arises the same problem that the factor of this hysteresis occurrence depends on the phase noise of the ODU.

An object of the present invention is to resolve the problems in the system of switching receiving methods and avoid the problem of uncertainty of the switching point depending on the ODU phase noise so as to provide the BS digital broadcasting receiver capable of optimum reception.

DISCLOSURE OF THE INVENTION

In order to attain the above object, the BS digital broadcasting receiver of the present invention for time-division-multiplexing a plurality of poliphase PSK modulation waves having different numbers of phases and receiving a digital signal has first demodulation means having a first carrier regenerating apparatus for regenerating a carrier for demodulation based on a phase error in demodulation data of a section of PSK modulation waves having the smallest number of phases out of a plurality of poliphase PSK modulation waves, second demodulation means having a second carrier regenerating apparatus for regenerating a carrier for demodulation based on a phase error in demodulation data of PSK modulation waves of the entire number of phases of a plurality of poliphase PSK modulation waves, determination means for determining whether or not each carrier regenerated by the first and second regenerating apparatuses is locked, and selector means for selecting and outputting either the demodulation data outputted from the first demodulation means or the demodulation data outputted from the first demodulation means.

And when it is determined by the determination means that the lock of the carrier regenerated by the first carrier regenerating apparatus is maintained and the lock of the carrier regenerated by the second carrier regenerating apparatus is in a locked state, the selector means operates to select the demodulation data of the section of the PSK modulation waves having relatively many phases outputted from the second demodulation means and select the demodulation data of the section of the PSK modulation waves having relatively few phases outputted from the first demodulation means so as to output the data.

Moreover, the plurality of poliphase PSK modulation waves of the present invention are typically comprised of the BPSK, QPSK and 8PSK modulation waves.

A first embodiment of the present invention further has CNR operation means for, when the carrier regenerated by the first carrier regenerating apparatus is in a locked state, acquiring a CNR from distribution of receiving points of the demodulation data outputted from the first demodulation means, and the first carrier regenerating apparatus operates to regenerate the carrier for demodulation based on the phase error in demodulation data of a BPSK modulation section, and the second carrier regenerating apparatus operates, in the case where the CNR is the first predetermined value or more, to regenerate the carrier for demodulation based on the phase errors in demodulation data of the BPSK modulation section, the QPSK modulation section and the 8PSK modulation section, and the selector means operates, in the case where the CNR acquired by operation is the second predetermined value or more, to select the demodulation data of the 8PSK modulation section outputted from the second demodulation means and select the demodulation data of the BPSK modulation section and the QPSK modulation section outputted from the first demodulation means so as to output the data.

In a second embodiment, the first carrier regenerating apparatus operates to regenerate the carrier for demodulation based on the phase error in the demodulation data of the BPSK modulation section, and the second carrier regenerating apparatus operates, in the case where the CNR is less than the first predetermined value, to regenerate the carrier for demodulation based on the phase errors in demodulation data of the BPSK modulation section and the QPSK modulation section, and the selector means operates, in the case where the CNR acquired by the operation is less than the second predetermined value, to select the demodulation data of the QPSK modulation section outputted from the second demodulation means and select the demodulation data of the BPSK modulation section outputted from the first demodulation means so as to output the data.

In a third embodiment, the first carrier regenerating apparatus operates to regenerate the carrier for demodulation based on the phase error in the demodulation data of the BPSK modulation section, and the second carrier regenerating apparatus operates, in the case where the CNR is the first predetermined value or more, to regenerate the carrier for demodulation based on the phase errors in the demodulation data of the BPSK modulation section, the QPSK modulation section and the 8PSK modulation section, and also in the case where the CNR is less than the first predetermined value, to regenerate the carrier for demodulation based on the phase errors in demodulation data of the BPSK modulation section and the QPSK modulation section, and the selector means operates, in the case where the CNR acquired by the operation is the second predetermined value or more, to select the demodulation data of the 8PSK modulation section outputted from the second demodulation means and select the demodulation data of the BPSK modulation section and the QPSK modulation section outputted from the first demodulation means, and in the case where the CNR acquired by the operation is less than the predetermined second value, to select the demodulation data of the QPSK modulation section outputted from the second demodulation means and select the demodulation data of the BPSK modulation section outputted from the first demodulation means so as to output the data.

Each of the above embodiments has copy means for, in the case where the carrier regenerated by the second carrier regenerating apparatus is not locked, copying the output from the loop filter in the first carrier regenerating apparatus when the carrier regenerated by the first carrier regenerating apparatus is in a locked state to the output from the loop filter in the second carrier regenerating apparatus.

Furthermore, the determination means preferably outputs a lock signal for representing that the regenerated carrier of each demodulation means entered a lock range, based on the demodulation data from the first and second demodulation means and the modulation system identifying signals.

BEST MODE FOR CARRYING OUT THE INVENTION

Hereafter, a BS digital broadcasting receiver related to the present invention will be described by an embodiment thereof.

Figure 1:
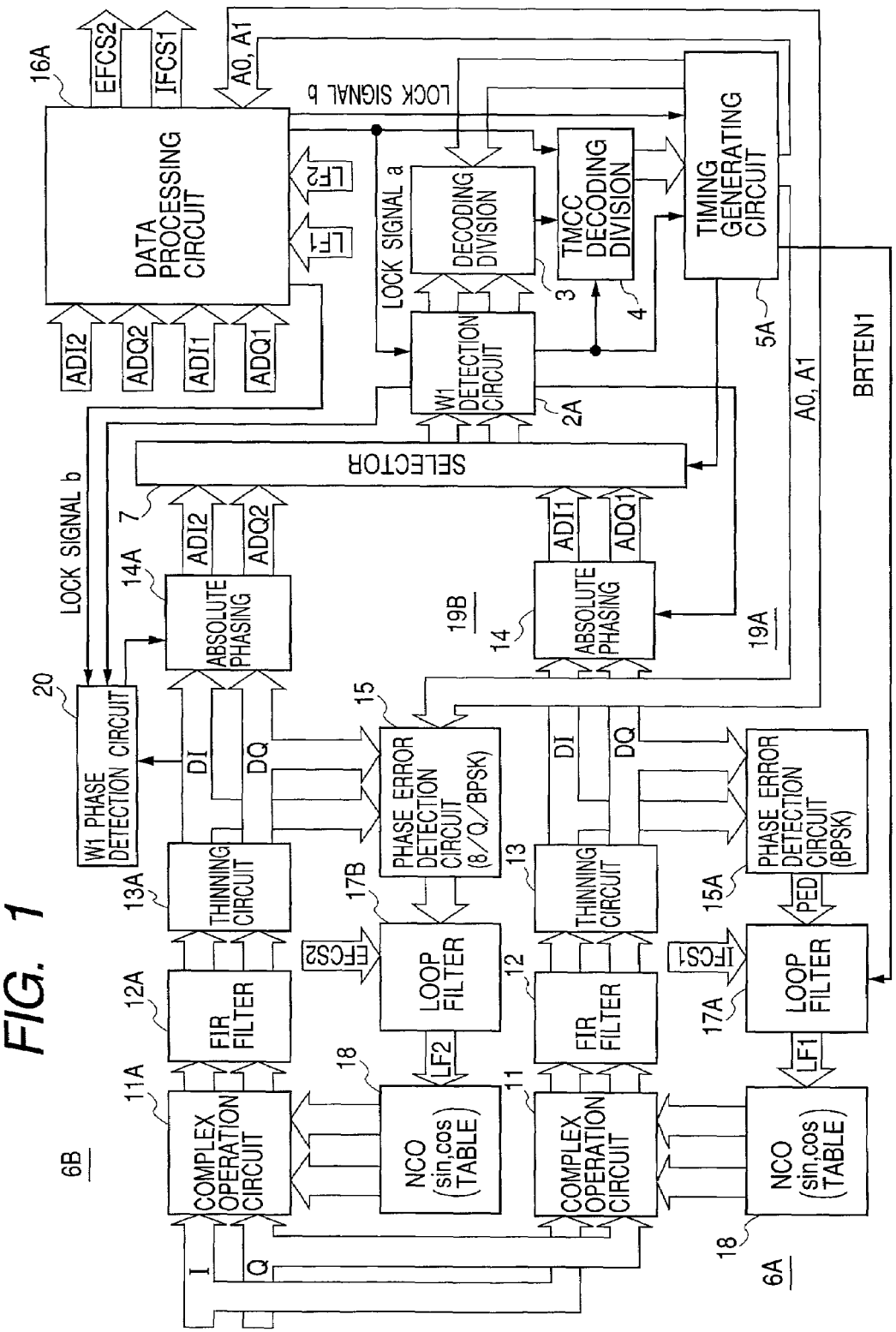
FIG. 1 is a block diagram showing a configuration of a BS digital broadcasting receiver related to an embodiment of the present invention.
Figure 12:
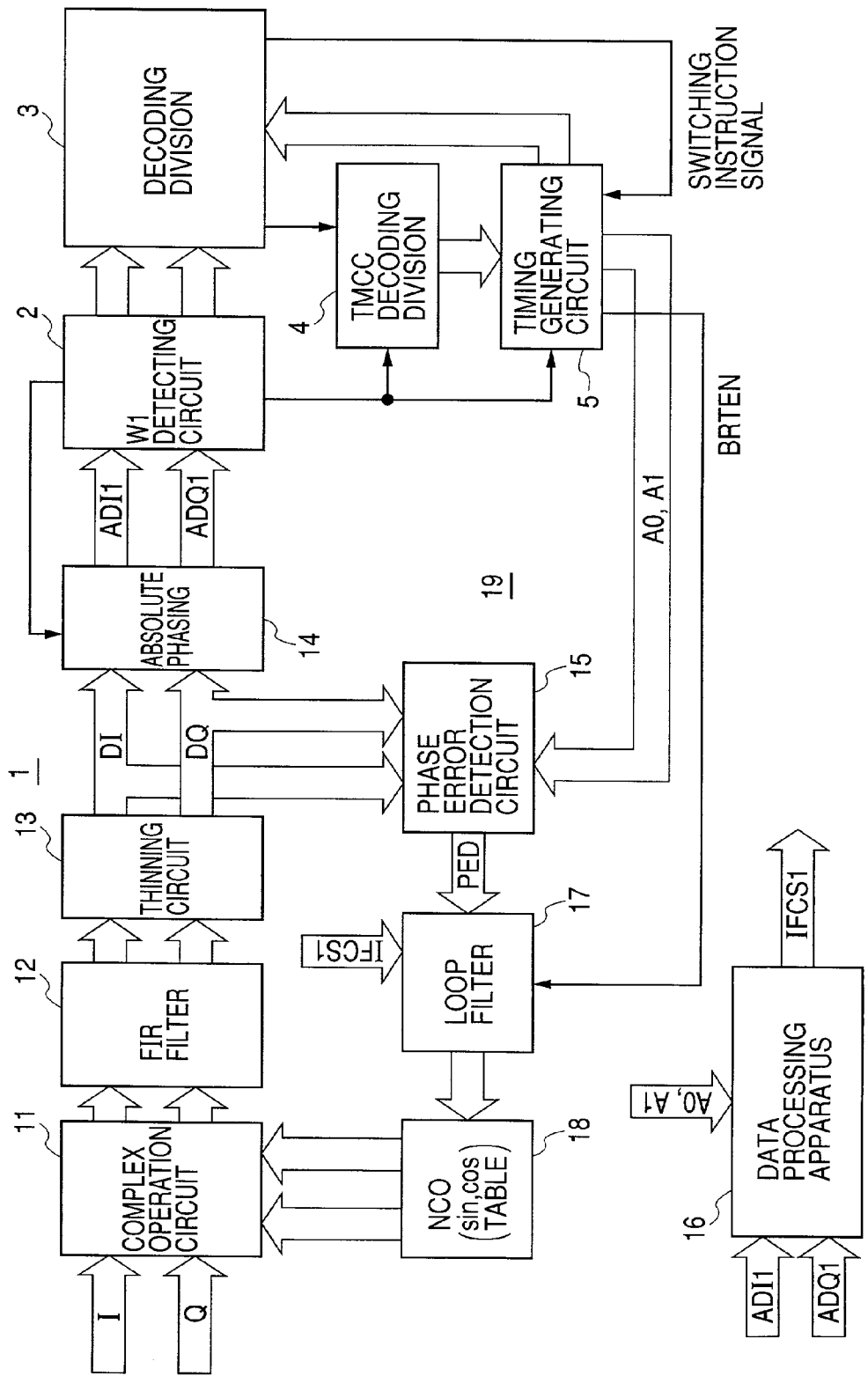
FIG. 12 is a block diagram showing a configuration of a conventional BS digital broadcasting receiver.
Figure 13:
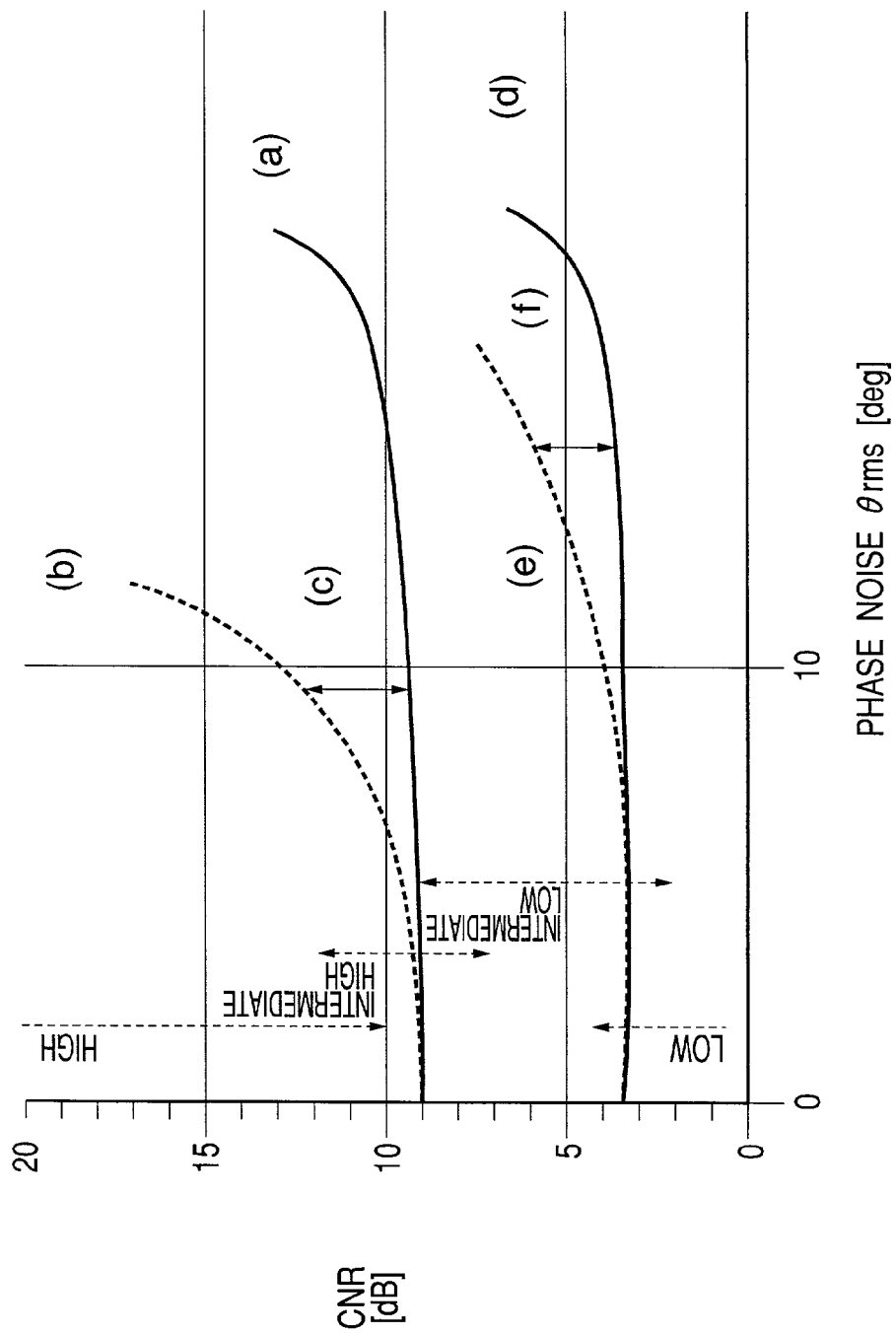
FIG. 13 is a drawing explaining a marginal CNR by phase noise in continuous reception and burst reception.

FIG. 1 is a block diagram showing a configuration of a BS digital broadcasting receiver related to an embodiment of the present invention. The BS digital broadcasting receiver related to an embodiment of the present invention has two demodulator circuits. In addition, FIG. 1 shows the same symbols as to the same components as those of a conventional BS digital broadcasting receiver shown in FIG. 12.

The BS digital broadcasting receiver related to an embodiment of the present invention has demodulator circuits 6A and 6B. The demodulator circuit 6A has a phase error detection circuit 15A having a phase error table for detecting a phase error signal only from demodulation data of a BPSK modulation wave (also referred to as the demodulation data of a BPSK modulation section, and likewise in the case of other modulation) instead of a phase error detection circuit 15 in a demodulator circuit 1 in the conventional BS digital broadcasting receiver. The demodulator circuit 6B further has a W1 phase detection circuit 20 in a demodulator circuit 1.

The BS digital broadcasting receiver related to an embodiment of the present invention has a selector 7 for selecting either demodulation data ADI1 and ADQ1 outputted from the demodulator circuit 6A or demodulation data ADI2 and ADQ2 outputted from the demodulator circuit 6B, a W1 detection circuit 2A for having the demodulation data selected by the selector 7 and a lock signal a supplied, a decoding division 3, a TMCC decoding division 4, a timing generation circuit 5A for having TMCC signals, a frame synchronization pattern and a lock signal b supplied, and a data processing circuit 16A. The phase error detection circuit 15A, a loop filter 17A and a numerical control frequency oscillator 18 constitute a carrier regenerating circuit 19A, and the phase error detection circuit 15, a loop filter 17B and a numerical control frequency oscillator 18 constitute a carrier regenerating circuit 19B.

The demodulator circuit 6A is a main demodulator circuit and performs on a complex operation circuit 11 a complex operation on I and Q signals orthogonally detected by a quasi-synchronous detection system with output from the numerical control frequency oscillator 18, and supplies demodulation data DI and DQ outputted through a roll-off filter 12 and a thinning circuit 13 to the phase error detection circuit 15A for performing carrier regeneration from the demodulation data of the BPSK modulation section to acquire a phase error voltage PED required for carrier regeneration and supplies it to the loop filter 17A, where a tuning voltage LF1 is acquired. The tuning voltage LF1 outputted from the loop filter 17A is supplied to the numerical control frequency oscillator 18, and the I and Q signals are demodulated by performing a complex operation for phase rotation based on an oscillation frequency from the numerical control frequency oscillator 18. This demodulation is performed by the regenerated carrier based on the demodulation data of the BPSK modulation wave.

Figure 11:
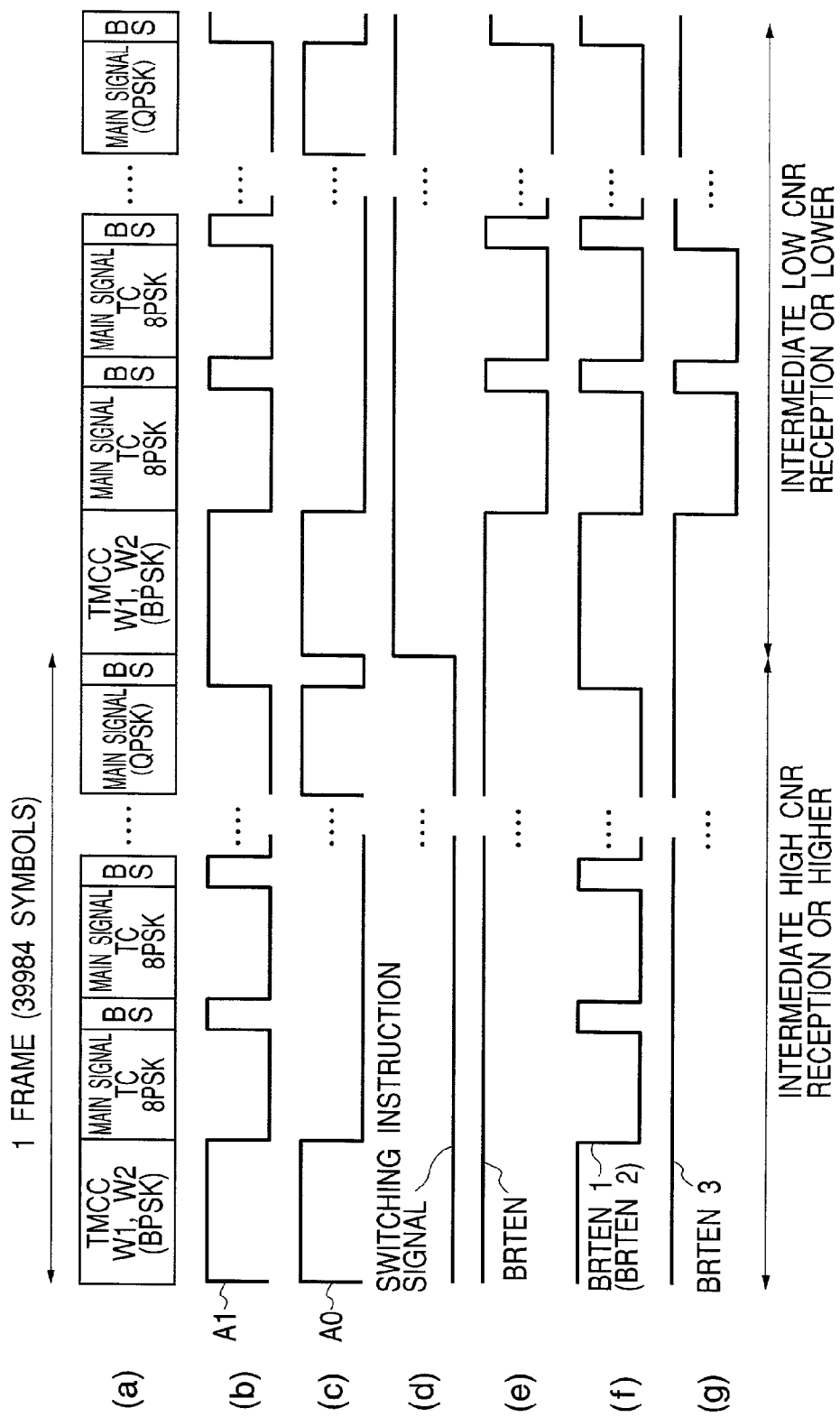
FIG. 11 is a timing chart for switching receiving modes in the BS digital broadcasting receiver related to an embodiment of the present invention and a deformation example thereof.

The selector 7 initially selects the demodulation data ADI1 and ADQ1 outputted from the demodulator circuit 6A. The W1 detection circuit 2A detects the frame synchronization pattern (W1) from the demodulation data ADI1 and ADQ1, and if frame timing is established, time-series positions of the frame synchronization pattern, TMCC signals super frame identification pattern and burst symbols are found respectively so that a burst enable 1 (BRTEN1) signal shown in FIG. 11F is outputted from the timing generation circuit 5A.

A lock signal a is received, and the TMCC signals are decoded in a decoding division 4.

The phase error detected by the phase error detection circuit 15A is supplied to the loop filter 17A, and filtering/holding operation is performed on the BRTEN1 signal outputted from the timing generation circuit 5A. On the phase error detection circuit 15A, however, only a phase error table for the demodulation data of the BPSK modulation section is provided, so that carrier regeneration based on the phase error acquired from for the demodulation data of the BPSK modulation section is performed on the a carrier regenerating circuit 19A. This regenerated carrier allows burst reception, and low CNR reception becomes possible by performing reception of only the BPSK modulation section (burst reception).

Various modulation signals including the above signal of the BPSK-modulated section are absolutely positioned on a sending end so that it is possible to restore an absolute phase on a receiving end from a standard of a receiving point of the frame synchronization pattern. In the burst reception operation of the BPSK modulation section, it is received either in an absolute phase or in a 180-degree rotated phase. As for determination of which phase it was received in, the frame synchronization pattern W1 that is "1110110011010101000" if received in the absolute phase just becomes "0001001100101101011"in an opposite phase so that absolute phasing can be performed by a detected phase of the frame synchronization pattern.

The timing generation circuit 5A outputs all the modulation system identifying signals (A0 and A1) that recognize the 8PSK, QPSK and BPSK modulation system sections in a transmission mode out of the TMCC signals decoded by the TMCC decoding division 4.

The demodulator circuit 6B performs on a complex operation circuit 11A a complex operation on I and Q signals orthogonally detected by a quasi-synchronous detection system with output from the numerical control frequency oscillator 18A, and supplies demodulation data DI and DQ outputted through a roll-off filter 12A and a thinning circuit 13A to the phase error detection circuit 15A for performing carrier regeneration from the demodulation data of the BPSK modulation section, the QPSK modulation section and 8BSK modulation section to acquire the phase error voltage required for carrier regeneration and supplies it to the loop filter 17B, where a tuning voltage LF2 is acquired.

The tuning voltage LF2 outputted from the loop filter 17B is supplied to the numerical control frequency oscillator 18A, and the I and Q signals are demodulated by performing a complex operation based on the oscillation frequency from the numerical control frequency oscillator 18A. In this phase error detection, based on the demodulation system identification number, the phase error tables for the demodulation data of the BPSK modulation section, the QPSK modulation section and the 8PSK modulation section are switched so as to detect a phase error and perform the carrier regeneration for each of them. Absolute phasing is performed based on the results of detecting a reception phase of the frame synchronization pattern W1 and receiving the lock signal b in the W1 phase detection circuit 20.

As described above, the demodulator circuit 6B basically performs the carrier regeneration by implementing the continuous reception. The selector 7 selects the demodulation data ADI2 and ADQ2 outputted from the demodulator circuit 6B in the 8PSK modulation section after establishing synchronization based on the lock signal b, and selects in other sections the demodulation data ADI1 and ADQ1 outputted from the demodulator circuit 6A.

The BS digital broadcasting receiver related to an embodiment of the present invention does not perform switching control of the continuous reception and the burst reception in high CNR reception and intermediate CNR reception.

Operation of the data processing circuit 16A is basically AFC operation of the carrier regeneration of the demodulator circuit 6A, carrier lock determination of the demodulator circuits 6A and 6B and control of the loop filters 17A and 17B of the demodulator circuits 6A and 6B.

Figure 2:
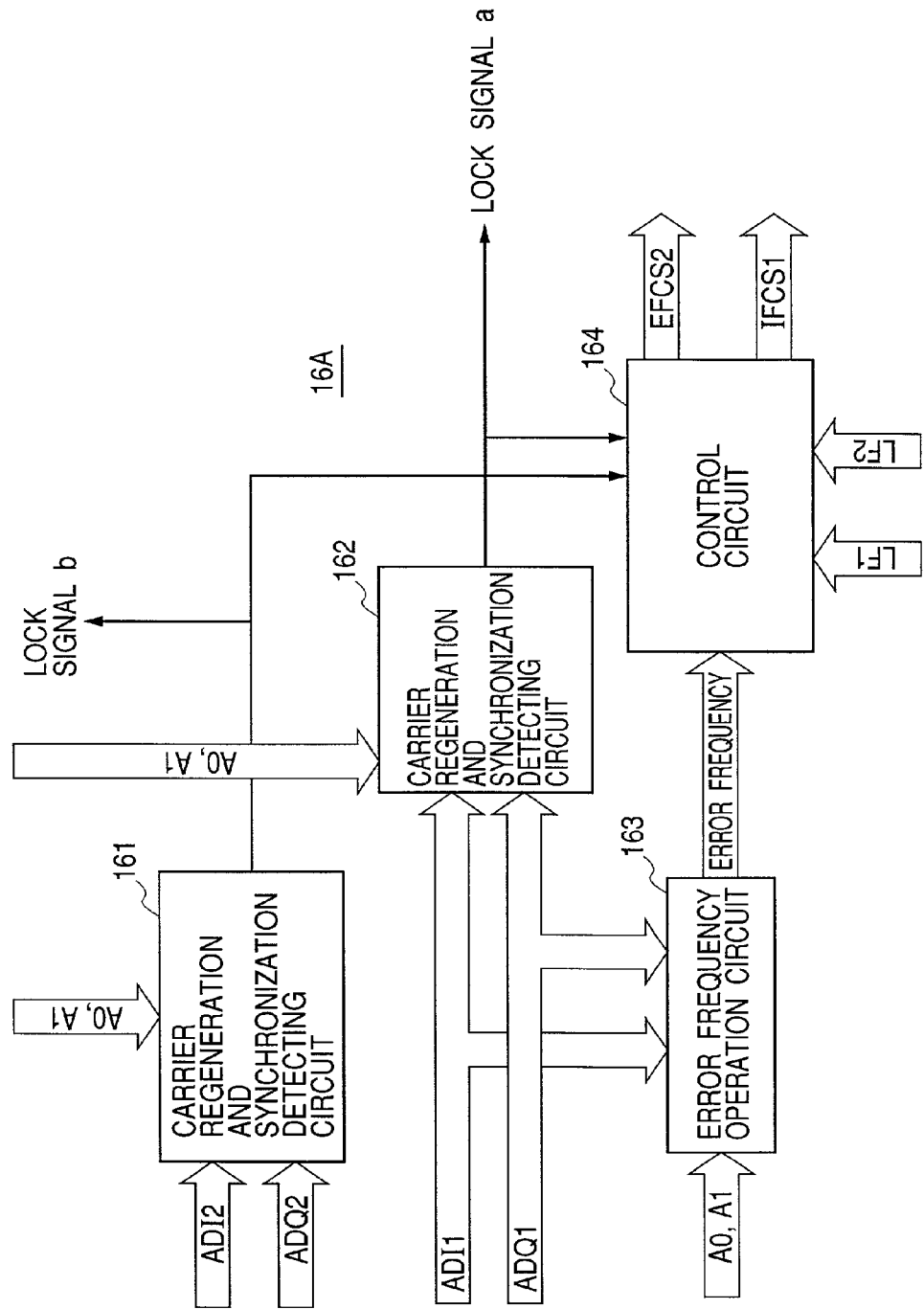
FIG. 2 is a block diagram showing a configuration of a data processing circuit of the BS digital broadcasting receiver related to an embodiment of the present invention.

The data processing circuit 16A is configured as shown in FIG. 2, where it detects by a carrier regeneration and synchronization detecting circuit 161 that the regenerated carrier is locked (in this specification, to be locked means that the regenerated carrier has entered a lock range of the carrier regenerating circuit) from the demodulation data ADI2 and ADQ2 and the modulation system identifying signals (A0 and A1) and outputs the lock signal b, and likewise detects by a carrier regeneration and synchronization detecting circuit 162 that the regenerated carrier is locked from the demodulation data ADI1 and ADQ1 and the modulation system identifying signals and outputs the lock signal a, and performs an operation on an error frequency by an error frequency operation circuit 163 from the demodulation data ADI1 and ADQ1 and the modulation system identifying signals, and outputs a control voltage IFCS1 to the loop filter 17A by a control circuit 164 from the lock signal a, the lock signal b, the tuning voltages LF1 and LF2 and the error frequency signal, and then outputs a control voltage EFCS2 to the loop filter 17B.

Operation of the data processing circuit 16A will be mainly described. First of all, frame synchronization is performed on the W1 detection circuit 2A by rough scanning operation (a scan value is given from the control voltage IFCS1 to the tuning voltages LF1) of the AFC. At this time, the regenerated carrier is not locked on the demodulator circuit 6A yet. It calculates the error frequency of the regenerated carrier from the signals of the TMCC section of the demodulation data ADI1 and ADQ1 knowable from the demodulation system identifying signals (A0 and A1), and superimposes the error frequency on the tuning voltage LF1 so as to set the tuning voltages LF1 by way of the control voltage IFCS1.

Thereafter, it burst-operates the loop filter 17A. Burst operation controls the loop filter 17A with BRTEN1 as an enable signal, and renders the TMCC signal section and the burst symbol section as its enable sections. It checks the lock of the regenerated carrier by detecting distribution of the receiving points of the demodulation data ADI1 and ADQ1 in the TMCC signal section and the burst symbol section knowable from demodulation system identifying signals (A0 and A1).

When it is detected from the lock signal a that the regenerated carrier is locked, all the receiving points are absolutely phased by an absolute phasing circuit 14, and the TMCC signals are decoded at the TMCC decoding division 4. The decoded TMCC signals are received and the modulation system identifying signals A0 and A1 are generated at the timing generation circuit 5A. The tuning voltage LF1 of the demodulator circuit 6A is copied to the tuning voltage LF2 by way of the control voltage EFCS2.

If it is checked with the lock signal b that the regenerated carrier in the demodulator circuit 6B is locked in the same manner as the above demodulator circuit 6A, all the receiving points of the demodulation data DI and DQ outputted from the demodulator circuit 6B are absolutely phased. And then, the selector 7 selects the demodulation data ADI2 and ADQ2 in the 8PSK modulation section from the demodulator circuit 6B and the demodulation data of other modulation sections from the demodulator circuit 6A. The selector 7 selects the demodulation data from the demodulator circuit 6A in an initial state and when the regenerated carrier of the demodulator circuit 6B is unlocked.

In addition, as for the above method of checking the lock, there is a method, for instance, of calculating distribution values of the receiving points based on the demodulation data of BPSK-modulated burst symbols.

As described above, the data processing circuit 16A checks the lock of the regenerated carrier and then provides the tuning voltage LF1 as the control voltage EFCS2 of the demodulator circuit 6B, and monitors ADI2 and ADQ2 to check the lock of the carrier regeneration. Moreover, in the case of the intermediate CNR reception and the low CNR reception, it is highly likely that the regenerated carrier of the demodulator circuit 6B is not locked, and so the value of the tuning voltage LF2 may remarkably slump.

In that case, however, the data processing circuit 16A copies the tuning voltage LF1 to the tuning voltage LF2 by controlling the control voltage EFCS2 every time it is unlocked so that the tuning voltage LF2 will not be far from the tuning voltage LF1, in other words, so that it will stay within a capture range of the demodulator circuit 6B. Accordingly, the turning voltage LF2 recovers fast, and besides, the burst reception and the continuous reception are simultaneously performed, and so it is possible to avoid the problem of uncertainty of the mode switching level depending on the ODU phase noise.

Figure 5:
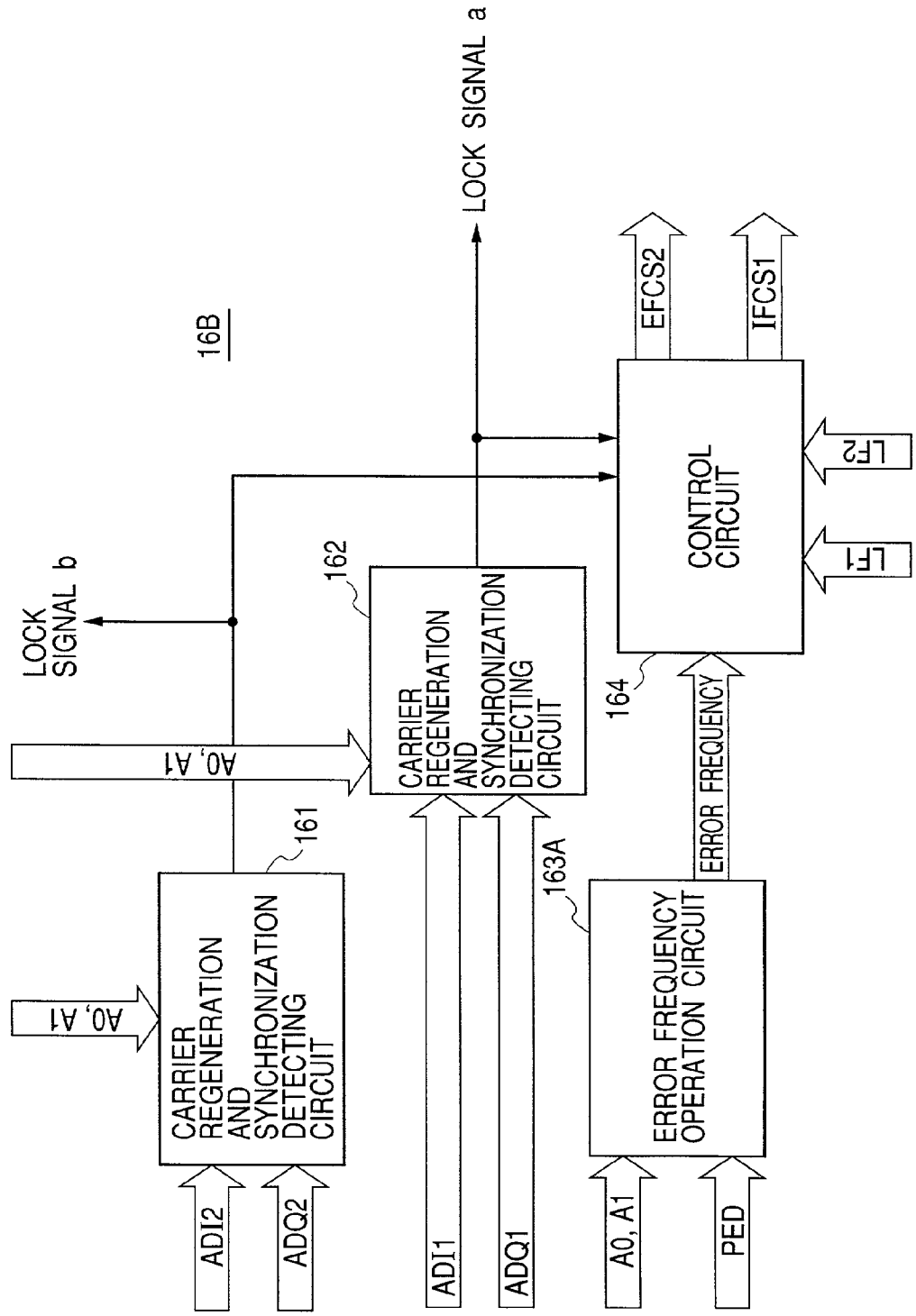
FIG. 5 is a block diagram showing another configuration of the data processing circuit of the BS digital broadcasting receiver related to an embodiment of the present invention.

Moreover, a deformation example of the data processing circuit 16A will be described. FIG. 5 is a block diagram of the data processing circuit 16B that is a deformation example of the data processing circuit 16A. The data processing circuit 16B provides an error frequency operation circuit 163A instead of the error frequency operation circuit 163 in the data processing circuit 16A, and the error frequency is computed by the error frequency operation circuit 163A from the modulation system identifying signals A0 and A1 and a phase error signal PED outputted from the phase error detection circuit 15A. Otherwise, it is the same as the data processing circuit 16A.

Figure 3:
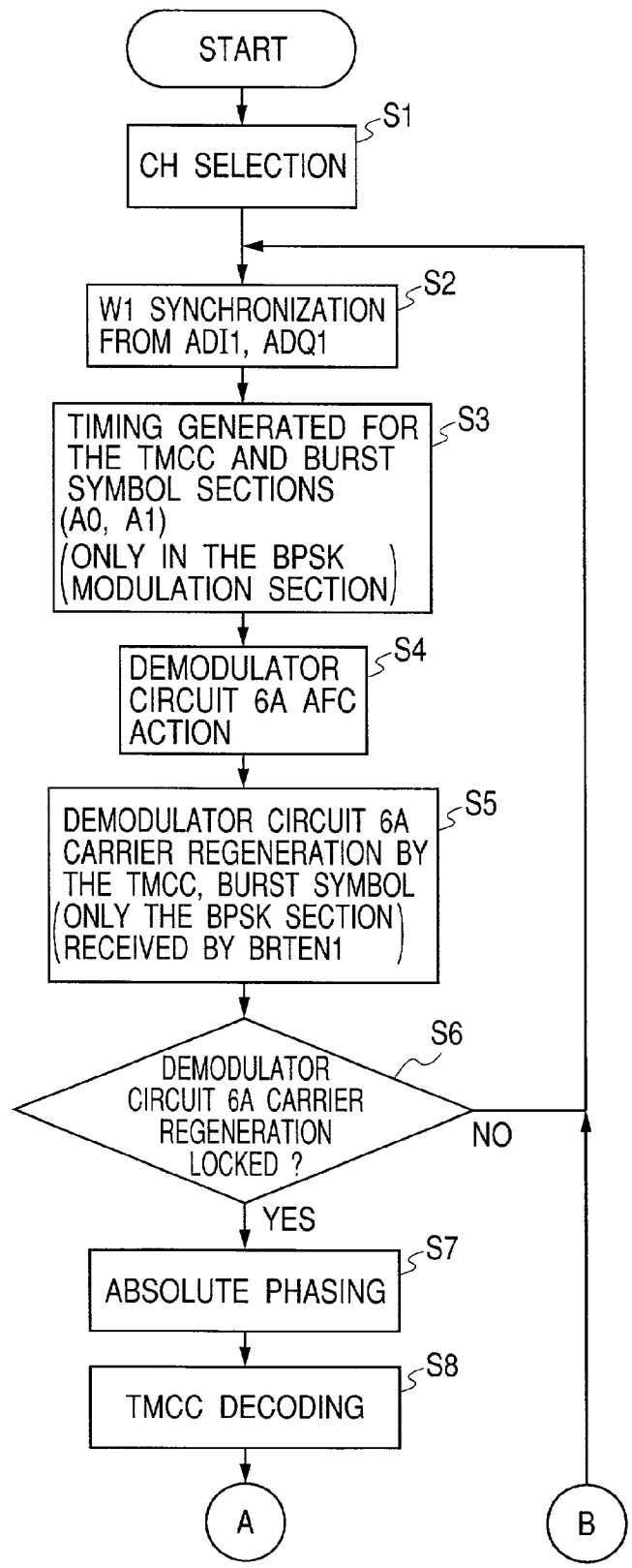
FIG. 3 is a flowchart for explaining workings of the BS digital broadcasting receiver related to an embodiment of the present invention.
Figure 4:
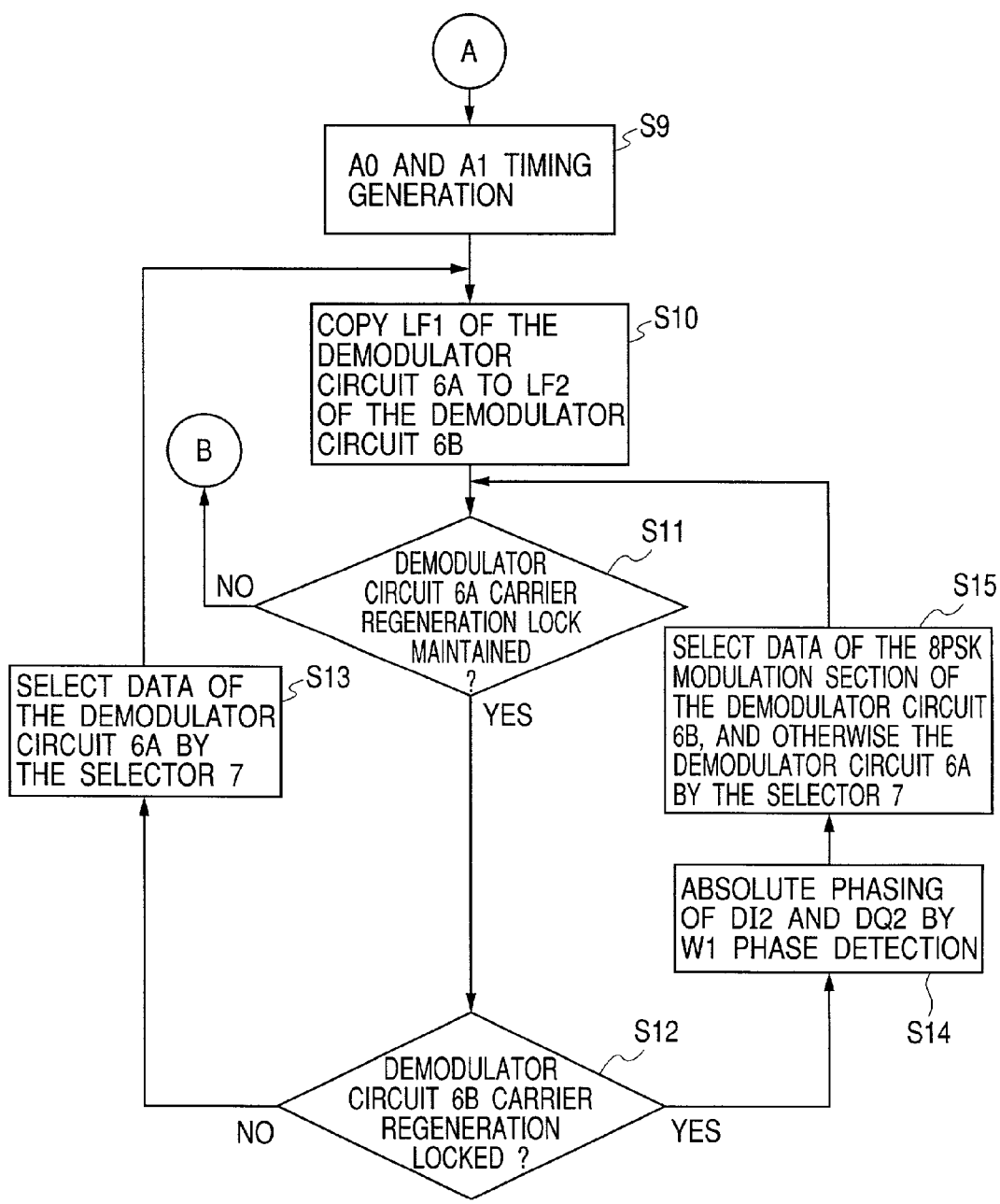
FIG. 4 is a flowchart for explaining workings of the BS digital broadcasting receiver related to an embodiment of the present invention.

Next, the above workings in the BS digital broadcasting receiver related to an embodiment of the present invention will be described according to the flowcharts shown in FIGS. 3 and 4.

If a channel is selected (step S1), the W1 frame is synchronized from the demodulation data ADI1 and ADQ1 (step S2). Following the step S2, timing signals of the TMCC signal section and the burst symbol section are generated (step S3). In the step S3, the TMCG signals, the burst symbols and the modulation system identifying signals (A0 and A1) for indicating the BPSK modulation section are generated. Following the step S3, the AFC action of the demodulator circuit 6A is performed (step S4), and carrier regeneration by the TMCC signals and the burst symbols is performed on the demodulator circuit 6A (step S5). In the step S5, only the BPSK modulation section is received by the BRTEN1 signal.

Following the step S5, it is checked whether or not the regenerated carrier is locked on the demodulator circuit 6A, and when it is determined as unlocked, it is repeatedly executed again from the step S2 following the step S6 until getting locked. When the regenerated carrier is determined to be locked, absolute phasing is performed following the step S6 (step S7), and then the TMCC signals are decoded (step S8). Following the step S8, the timing signals of the modulation system identifying signals A0 and A1 for identifying all the modulation systems are sent (step S9), and the tuning voltage LF1 of the demodulator circuit 6A is copied to the tuning voltage LF2 (step S10).

Following the step S10, it is checked whether or not the lock of the regenerated carrier of the demodulator circuit 6A is maintained (step S11), and when it is determined that the lock thereof is not maintained, it is repeatedly executed again from the step S2 following the step S11. When it is determined that the lock of the regenerated carrier is maintained in the step S11, it is checked following the step S11 whether or not the regenerated carrier of the demodulator circuit 6B is locked (step S12).

When it is determined that the lock of the regenerated carrier is not maintained in the step S12, the demodulation data ADI1 and ADQ1 outputted from the demodulator circuit 6A is selected by the selector 7 following the step S12 (step S13), and then it is executed again from the step S10.

In the step S12, when it is determined that the lock of the regenerated carrier is maintained, absolute phasing is performed on the demodulation data DI2 and DQ2 by the W1 phase detection circuit 20 following the step S12 (step S14), and then the demodulation data ADI2 and ADQ2 of the 8PSK modulation section of the demodulator circuit 6B is selected by the selector 7, and other demodulation data of the QPSK and BPSK sections is selected from the demodulation data ADI1 and ADQ1 from the demodulator circuit 6A (step S15), and it is repeatedly executed from the step S11.

As described above, according to the BS digital broadcasting receiver related to an embodiment of the present invention, the demodulator circuit 6B constantly performs continuous reception irrespective of the high CNR reception or the intermediate CNR reception, and so a bit error rate (BER) of the 8PSK modulation section will not be influenced by the ODU phase noise. On the other hand, as the demodulator circuit (6A) constantly performs burst reception of BPSK-modulated waves irrespective of the high CNR reception or the intermediate CNR reception, the carrier regeneration will not break down and the frame synchronization will not fail. Accordingly, it is not necessary to make a difficult determination of where to select the optimum point for switching the above described high CNR reception and intermediate CNR reception, and there is little influence from the phase noise. In addition, the control of switching itself is not required so that the operation becomes stable.

Next, a deformation example of the BS digital broadcasting receiver related to an embodiment of the present invention will be described.

Figure 6:
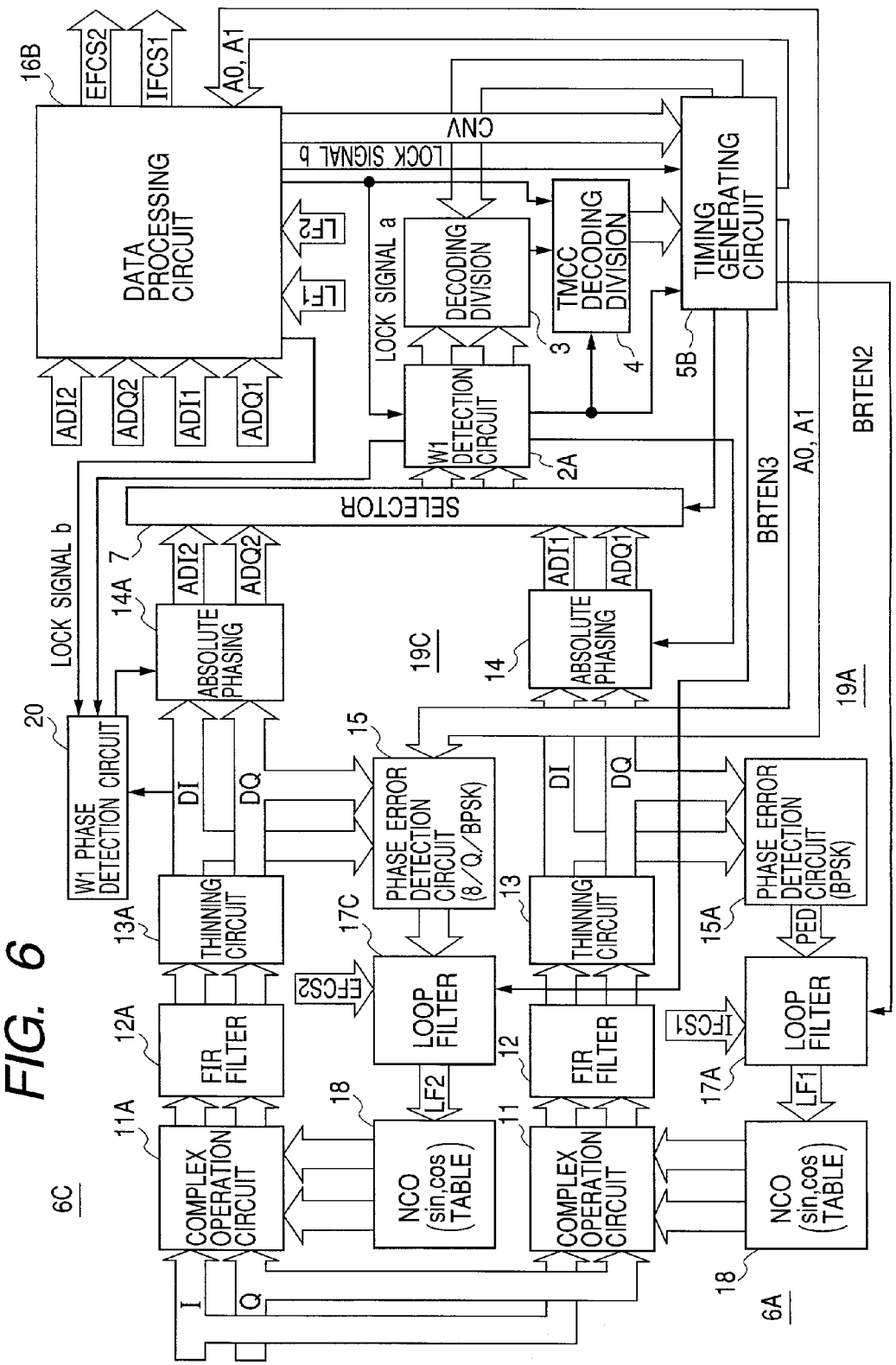
FIG. 6 is a block diagram showing a configuration of a deformation example of the BS digital broadcasting receiver related to an embodiment of the present invention.

FIG. 6 is a block diagram showing a configuration of a deformation example of the BS digital broadcasting receiver related to an embodiment of the present invention. This deformation example is a case that allows switching from the high CNR reception to the intermediate high CNR reception and also switching from the intermediate CNR reception to the low CNR reception.

In this deformation example, the demodulator circuit 6A has the same configuration as that of the BS digital broadcasting receiver related to an embodiment of the present invention. FIG. 6 shows a BRTEN2 signal that is the same signal as the BRTEN1 signal. As shown in FIG. 11G, a demodulator circuit 6C is different in that, instead of the loop filter 17B on the demodulator circuit 6B, it uses a carrier regenerating circuit 19C having a loop filter 17C wherein a BRTEN3 signal is supplied for enabling the BPSK modulation section, the QPSK modulation section and 8BSK modulation section on the high CNR reception or the intermediate high CNR reception and enabling the BPSK modulation section and the QPSK modulation section on the intermediate low CNR reception or the low CNR reception.

Figure 7:
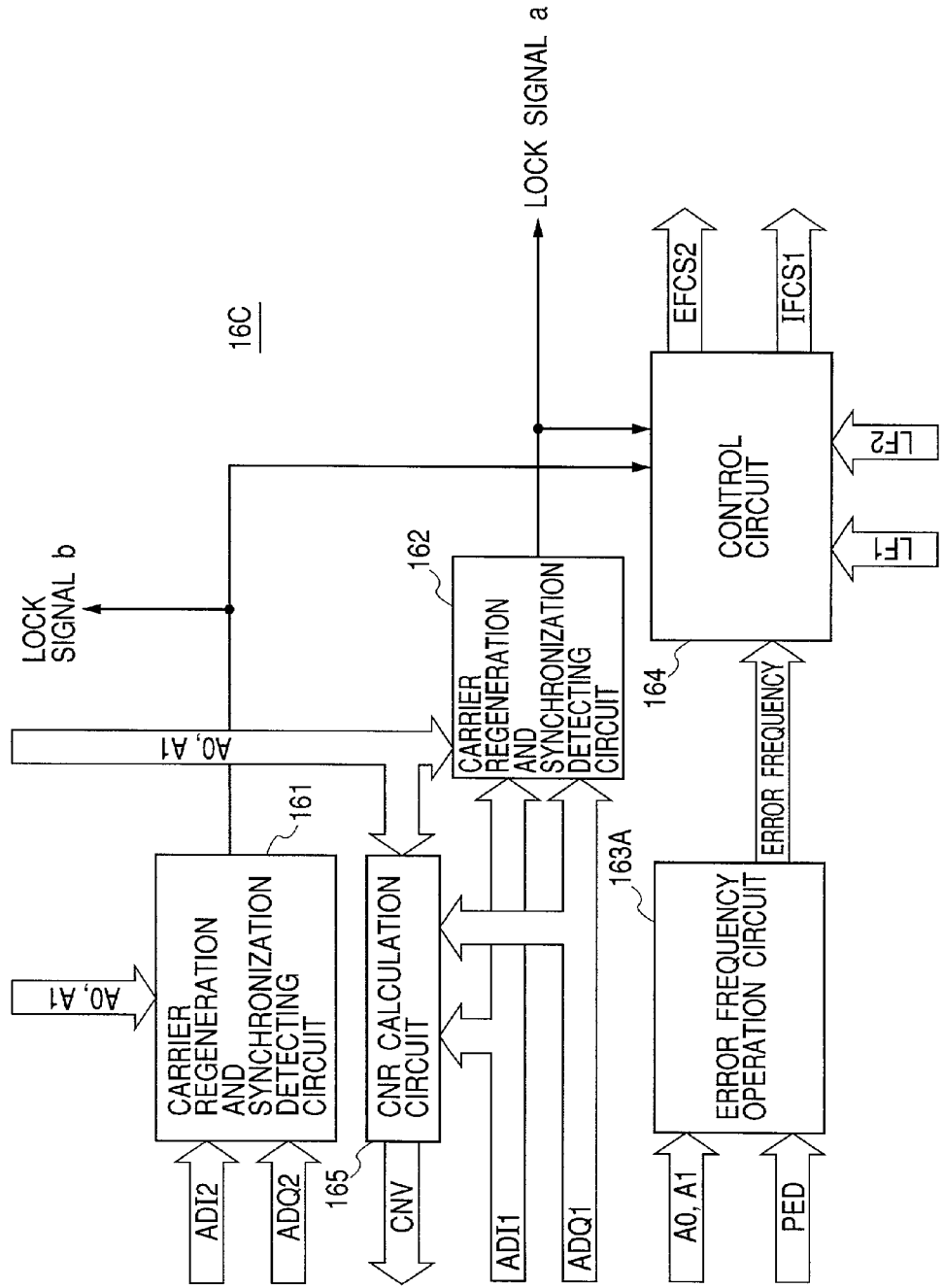
FIG. 7 is a block diagram showing a configuration of a data processing circuit of a deformation example of the BS digital broadcasting receiver related to an embodiment of the present invention.

Furthermore, this deformation example is different from the BS digital broadcasting receiver related to an embodiment of the present invention in that, as shown in FIG. 7, instead of the data processing circuit 16B, a data processing circuit 16C is used, wherein a CNR calculation circuit 165 for acquiring the CNR from the distribution values of the receiving points comprised of the demodulation data ADI1 and ADQ1 is added to the data processing circuit 16B, and that, instead of the timing generation circuit 5A, a timing generating circuit 5B is used, wherein the CNR acquired from the above distribution values is supplied.

Next, the workings of this deformation example will be described centering on the operation of the data processing circuit 16C. First of all, the frame synchronization is performed on the W1 detection circuit 2A by rough scanning operation (a scan value is given from the control voltage IFCS1 to the tuning voltage LF1) of the AFC. At this time, the regenerated carrier is not locked on the demodulator circuit 6A yet. It calculates the error frequency of the regenerated carrier from the signals of the TMCC section of the demodulation data ADI1 and ADQ1, and superimposes the error frequency on the tuning voltage LF1 so as to set the tuning voltages LF1 by way of the control voltage IFCS1.

Thereafter, it burst-operates the loop filter 17A. Burst operation controls the loop filter 17A with BRTEN2 as an enable signal, and renders the TMCC signal section and the burst symbol section as its enable sections. It checks the lock of the regenerated carrier by detecting distribution of the receiving points of the demodulation data ADI1 and ADQ1 in the TMCC signal section and the burst symbol section.

When the regenerated carrier is locked, all the receiving points are absolutely phased by the absolute phasing circuit 14, and the TMCC signals are decoded at the TMCC decoding division 4. The distribution values of the receiving points are calculated from the demodulation data ADI1 and ADQ1 so as to acquire the CNR. If the CNR is an intermediate high or higher CNR, the decoded TMCC signals are received and the modulation system identifying signals A0 and A1 are generated at the timing generation circuit 5B, and the modulation system identifying signal BRTEN3 is rendered as high potential. The tuning voltage LF1 of the demodulator circuit 6A is copied to the tuning voltage LF2 by way of the control voltage EFCS2.

If it is checked that the regenerated carrier in the demodulator circuit 6C is locked in the same manner as the above demodulator circuit 6A, all the receiving points of the demodulation data DI and DQ outputted from the demodulator circuit 6C are absolutely phased. And then, the selector 7 selects the demodulation data ADI2 and ADQ2 in the 8PSK modulation section from the demodulator circuit 6C and the demodulation data of other modulation sections from the demodulator circuit 6A.

On the other hand, if the CNR is not intermediate high or higher, the TMCC signals are decoded and the modulation system identifying signals A0 and A1 are generated at the timing generation circuit 5B, and the BRTEN3 signal is rendered as low potential only in the 8PSK modulation section, that is, disabled therein only and rendered as high potential in other modulation sections. The tuning voltage LF1 of the demodulator circuit 6A is copied to the tuning voltage LF2 of the demodulator circuit 6C by way of the control voltage EFCS2.

If it is checked that the regenerated carrier of the demodulator circuit 6C is locked, the receiving points based on the demodulation data ADI2 and ADQ2 of the demodulator circuit 6C are absolutely phased. And then, the selector 7 selects the demodulation data of the QPSK modulation section from the demodulator circuit 6C and the demodulation data of other modulation sections from the demodulator circuit 6A. The selector 7 selects the demodulation data from the demodulator circuit 6A in an initial state and when the regenerated carrier of the demodulator circuit 6C is unlocked.

Figure 8:
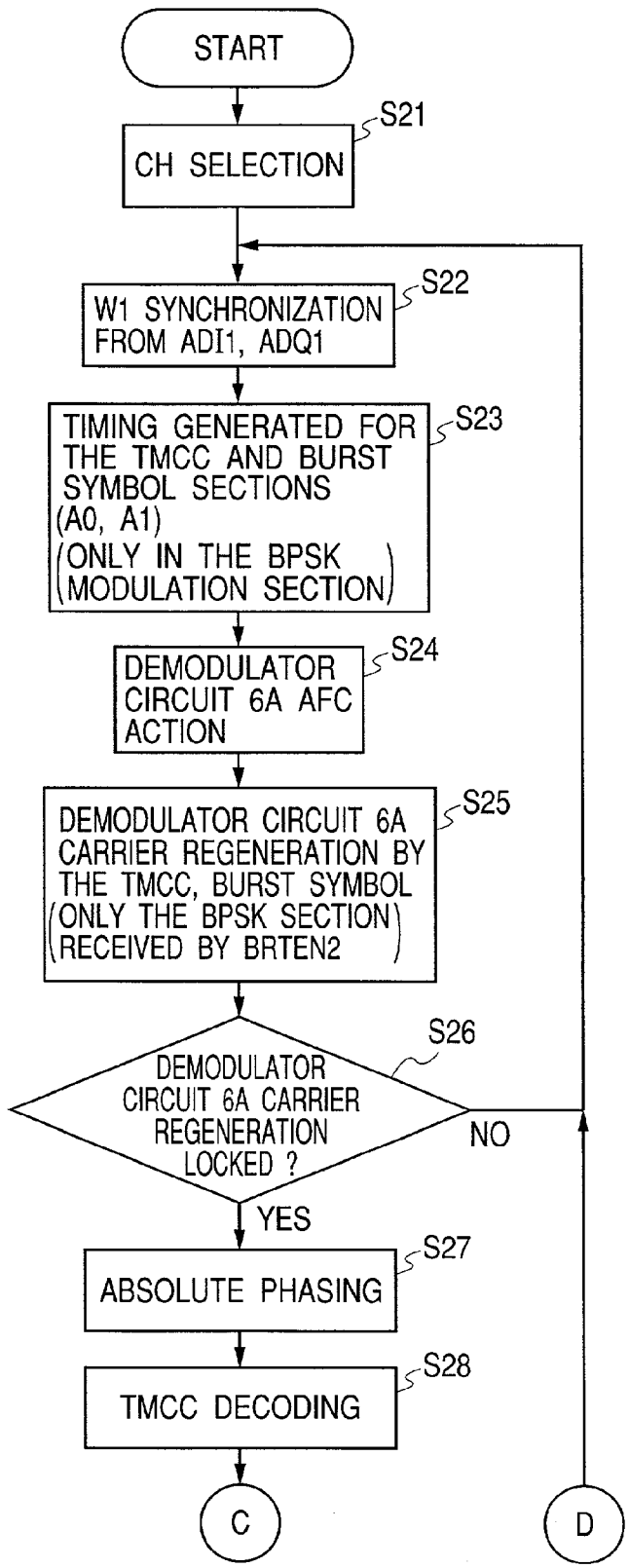
FIG. 8 is a flowchart for explaining workings of a deformation example of the BS digital broadcasting receiver related to an embodiment of the present invention.
Figure 9:
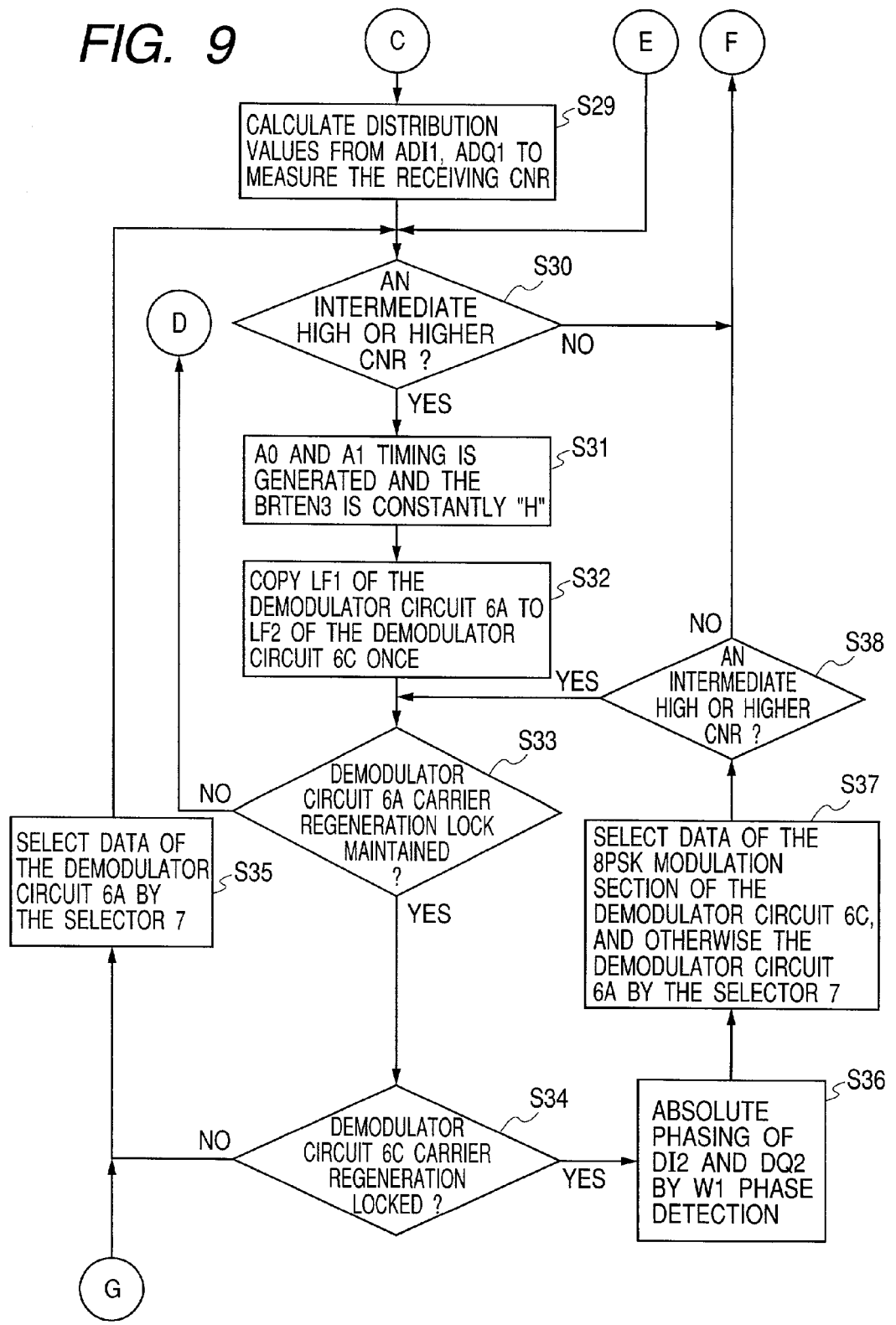
FIG. 9 is a flowchart for explaining workings of a deformation example of the BS digital broadcasting receiver related to an embodiment of the present invention.
Figure 10:
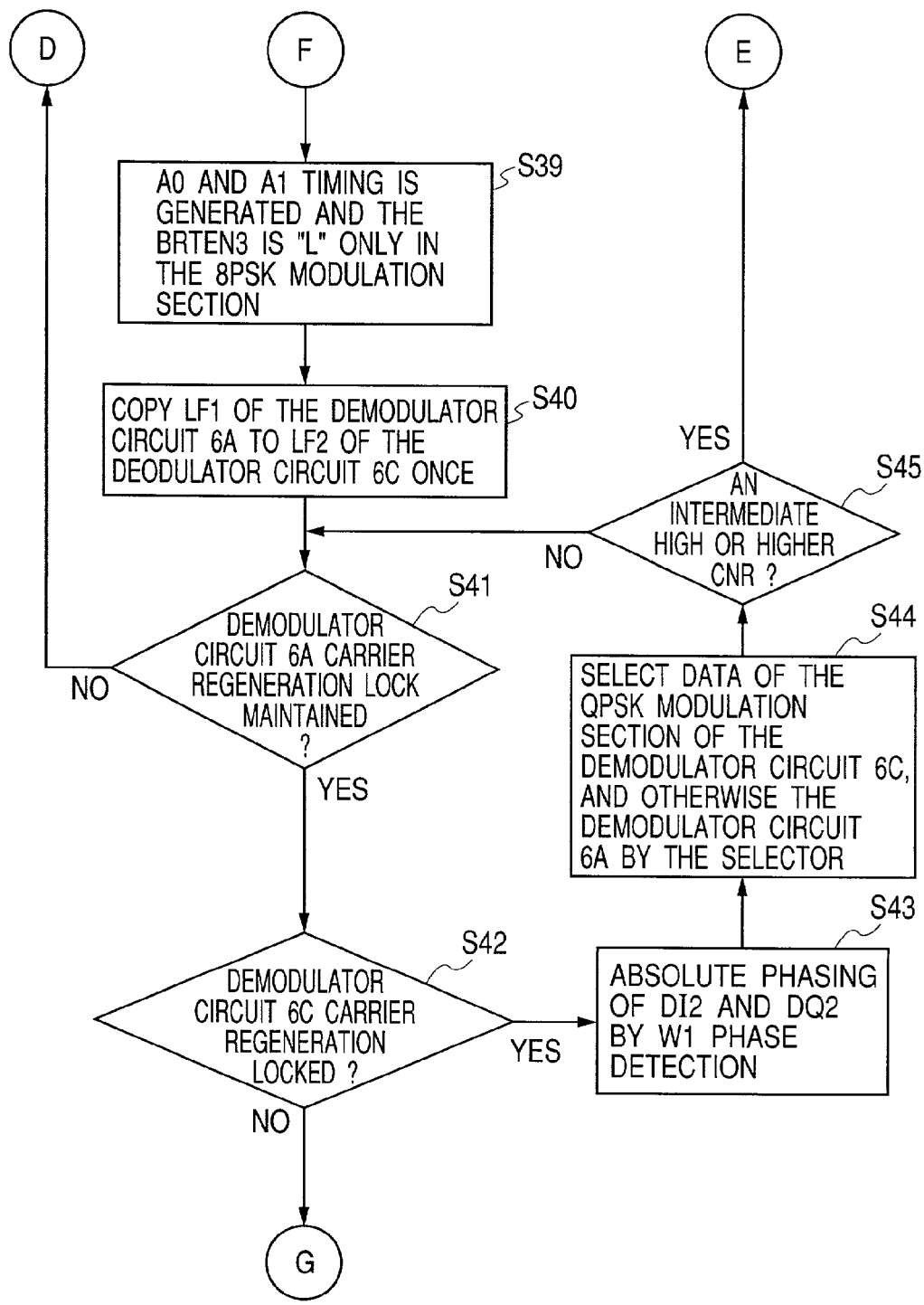
FIG. 10 is a flowchart for explaining workings of a deformation example of the BS digital broadcasting receiver related to an embodiment of the present invention.

Next, the above workings in the deformation example of the BS digital broadcasting receiver related to an embodiment of the present invention will be described according to the flowcharts shown in FIG. 8 to FIG. 10.

If a channel is selected (step S21), the W1 frame is synchronized from the demodulation data ADI1 and ADQ1 (step S22). Following the step S22, the timing signals of the TMCC signal section and the burst symbol section are generated (step S23). In the step S23, the modulation identifying signals (A0 and A1) for identifying the BPSK modulation section signals are generated. Following the step S23, the AFC action of the demodulator circuit 6A is performed (step S24), and carrier regeneration by the TMCC signals and the burst symbols is performed on the demodulator circuit 6A (step S25). In the step S5, only the BPSK modulation section is received by the BRTEN2 signal.

Following the step S25, it is checked whether or not the regenerated carrier is locked on the demodulator circuit 6A, and when it is determined as unlocked, it is repeatedly executed again from the step S22 following the step S26 until getting locked. When the regenerated carrier is determined to be locked, absolute phasing is performed following the step S26 (step S27), and then the TMCC signals are decoded (step S28). Following the step S28, the timing signals of the modulation system identifying signals A0 and A1 for identifying all the modulation systems are sent (step S29), and it is checked whether the CNR is an intermediate high or higher CNR (step S30).

In the step S30, if the CNR is determined to be an intermediate high or higher CNR, the modulation system identifying signals A0 and A1 are generated and the BRTEN3 is constantly rendered as high potential (step S31), and the tuning voltage LF1 of the demodulator circuit 6A is copied to the tuning voltage LF2 of the demodulator circuit 6C (step S32). Following the step S32, it is checked whether or not the lock of the regenerated carrier of the demodulator circuit 6A is maintained (step S33).

When it is determined that the lock of the regenerated carrier of the demodulator circuit 6A is not maintained in the step S33, the step S22 is executed from the step S33. When it is determined that the lock of the regenerated carrier of the demodulator circuit 6A is maintained in the step S33, it is checked following the step S33 whether or not the regenerated carrier of the demodulator circuit 6C is locked (step S34). When it is determined that the regenerated carrier of the demodulator circuit 6C is not locked in the step S34, the demodulation data of the demodulator circuit 6A is selected by the selector 7 and the step S30 is executed (step S35).

In the step S4, when it is determined that the lock of the regenerated carrier of the demodulator circuit 6C is locked, absolute phasing is performed on the demodulation data DI2 and DQ2 by the W1 phase detection circuit 20 (step S36), and then the demodulation data ADI2 and ADQ2 of the 8PSK modulation section of the demodulator circuit 6C is selected by the selector 7, and other demodulation data of the QPSK and BPSK sections is selected from the demodulator circuit 6A (step S37), and it is checked whether or not the CNR is an intermediate high or higher CNR (step S38), and if the CNR is determined to be an intermediate high or higher CNR, it is repeatedly executed from the step S33.

When the CNR is not determined to be intermediate high or higher in the step S38, or when the CNR is not determined to be intermediate high or higher in the step S30, the modulation system identifying signals A0 and A1 are generated, and the BRTEN3 signal is rendered as low potential only in the 8PSK modulation section (step S39). Following the step S39, the tuning voltage LF1 of the demodulator circuit 6A is copied to the tuning voltage LF2 of the demodulator circuit 6C (step S40).

Following the step S40, it is checked whether or not the lock of the regenerated carrier of the demodulator circuit 6A is maintained (step S41). When it is determined that the lock of the regenerated carrier of the demodulator circuit 6A is not maintained in the step S41, it is repeatedly executed from the step S22 following the step S41. When it is determined that the lock of the regenerated carrier of the demodulator circuit 6A is maintained in the step S41, it is checked whether or not the regenerated carrier of the demodulator circuit 6C is locked (step S42).

When it is determined that the lock of the regenerated carrier of the demodulator circuit 6C is not locked in the step S42, it is repeatedly executed from the step S35. When it is determined that the lock of the regenerated carrier of the demodulator circuit 6C is maintained in the step S42, absolute phasing is performed on the demodulation data DI2 and DQ2 by the W1 phase detection circuit 20 following the step S42 (step S43), and then the demodulation data ADI2 and ADQ2 of the QPSK modulation section of the demodulator circuit 6C are selected by the selector 7, and other demodulation data of the 8PSK and BPSK sections are selected from the demodulator circuit 6A (step S44).

Following the step S44, it is checked whether or not the CNR is a high CNR or an intermediate high CNR (step S45), and if the CNR is determined not to be a high CNR or an intermediate high CNR in the step S45, it is repeatedly executed from the step S41, and if the CNR is determined to be a high CNR or an intermediate high CNR in the step S45, it is repeatedly executed from the step S30.

To be more specific, in this deformation example, the BRTEN3 signal is always the high potential in the high CNR and the intermediate high CNR reception, and becomes the low potential only in the 8PSK modulation section in the intermediate low CNR and the low CNR reception. In the high CNR and the intermediate high CNR reception, the BRTEN2 signal is the low potential during the QPSK modulation section and 8BSK modulation section, and the demodulator circuit 6A is performing burst reception of the BPSK modulation section.

In the low CNR reception, the demodulator circuit 6A performs burst reception only in the BPSK modulation section while the BRTEN2 signal becomes the high potential. The roles of the demodulator circuit 6A are to maintain basic synchronization of the carrier regeneration system under the high CNR and the intermediate high CNR reception, to regenerate data of the QPSK modulation section, and to maintain basic synchronization of the carrier regeneration system under the intermediate low CNR and the low CNR reception. The roles of the demodulator circuit 6C are to regenerate data of the 8PSK modulation section in the carrier regeneration by the continuous reception under the high CNR reception, and to regenerate data of the QPSK modulation section and the BPSK modulation section by the burst reception except the 8PSK modulation section under the intermediate low CNR reception.

The respective determinations of the high, intermediate high, intermediate low and low CNR reception can be made by a circuit for computing the CNR (in the data processing circuit 16). In particular, on a determination of the intermediate high or intermediate low CNR, the receiving mode of the demodulator circuit 6A is switched to the demodulator circuit 6B, and selection of the selector 7 is switched to the data regeneration system by the demodulator circuit 6B. By doing so, the demodulator circuit 6B constantly performs burst reception except the 8PSK modulation section irrespective of the intermediate low CNR reception or the low CNR reception, and so the BER of the QPSK modulation section will not be influenced by the ODU phase noise.

On the other hand, as the demodulator circuit 6A constantly performs burst reception only in the burst symbol section irrespective of the intermediate low CNR reception or the low CNR reception, the carrier regeneration will not break down and the frame synchronization will not fail. Accordingly, it is possible to avoid a difficult problem of where to select the optimum point for switching the intermediate low CNR because the other demodulator circuit 6C is performing optimum reception, and there is little influence from the phase noise. In addition, the control of switching itself is not required so that the operation becomes stable.

INDUSTRIAL APPLICABILITY

As described above, the BS digital broadcasting receiver of the present invention can avoid, by placing the demodulator circuits in parallel, the problem of uncertainty of the switching point depending on the phase noise due to switching of the receiving modes for the high CNR reception and the intermediate CNR reception so as to allow optimum reception.

What is claimed is:

1. A broadcast satellite (BS) digital broadcasting receiver for receiving BS digital signals wherein bi-phase shift keying (BPSK), quadrature-phase shift keying (QPSK), and 8-phase shift keying (8PSK) modulation waves are time-division-multiplexed, said BS digital broadcasting receiver comprising:

a first demodulator circuit having a first carrier regenerating circuit for regenerating a carrier for demodulation based on a phase error in demodulation data of a BPSK modulation section;

a second demodulator circuit having a second carrier regenerating circuit for regenerating a carrier for demodulation based on a phase error in the demodulation data of the BPSK, QPSK, and 8PSK modulation sections; and a selector for, when a lock of the carrier regenerated by the first carrier regenerating circuit is maintained and the carrier regenerated by the second carrier regenerating circuit is in a locked state, selecting the demodulation data of the 8PSK modulation section outputted from the second demodulator circuit and selecting the demodulation data of the BPSK modulation section and the QPSK modulation section outputted from the first demodulator circuit to output the selected data.

2. A broadcast satellite (BS) digital broadcasting receiver for receiving BS digital signals wherein bi-phase shift keying (BPSK), quadrature-phase shift keying (QPSK), and 8-phase shift keying (8PSK) modulation waves are time-division-multiplexed, said BS digital broadcasting receiver comprising:

a first demodulator circuit having a first carrier regenerating circuit for regenerating a carrier for demodulation based on a phase error in demodulation data of a BPSK modulation section;

carrier to noise ratio (CNR) operation means for, when the carrier regenerated by the first carrier regenerating circuit is in a locked state, acquiring by operation a CNR from distribution of receiving points of the demodulation data outputted from the first demodulator circuit;

a second demodulator circuit having a second carrier regenerating circuit for, in the case where the CNR is a first predetermined value or more, regenerating a carrier for demodulation based on a phase error in the demodulation data of the BPSK, QPSK, and 8PSK modulation sections; and a selector for, in the case where the CNR acquired by operation is a second predetermined value or more, when a lock of the carrier regenerated by the first carrier regenerating circuit is maintained and the carrier regenerated by the second carrier regenerating circuit is in a locked state, selecting the demodulation data of the 8PSK modulation section outputted from the second demodulator circuit and selecting the demodulation data of the BPSK modulation section and the QPSK modulation section outputted from the first demodulator circuit to output the selected data.

3. A broadcast satellite (BS) digital broadcasting receiver for receiving BS digital signals wherein bi-phase shift keying (BPSK), quadrature phase shift keying (QPSK), and 8-phase shift keying (8PSK) modulation waves are time-division-multiplexed, said BS digital broadcasting receiver comprising:

a first demodulator circuit having a first carrier regenerating circuit for regenerating a carrier for demodulation based on a phase error in demodulation data of a BPSK modulation section;

carrier to noise ratio (CNR) operation means for, when the carrier regenerated by the first carrier regenerating circuit is in a locked state, acquiring a CNR from distribution of receiving points of the demodulation data outputted from the first demodulator circuit;

a second demodulator circuit having a second carrier regenerating circuit for, in the case where the CNR is less than a first predetermined value, regenerating a carrier for demodulation based on a phase error in the demodulation data of the BPSK and QPSK modulation sections; and a selector for, in the case where the CNR acquired by operation is less than a second predetermined value, when a lock of the carrier regenerated by the first carrier regenerating circuit is maintained and the carrier regenerated by the second carrier regenerating circuit is in a locked state, selecting the demodulation data of the QPSK modulation section outputted from the second demodulator circuit and selecting the demodulation data of the BPSK modulation section outputted from the first demodulator circuit to output the selected data.

4. A broadcast satellite (BS) digital broadcasting receiver for receiving BS digital signals wherein bi-phase shift keying (BPSK), quadrature-phase shift keying (QPSK), and 8-phase shift keying (8PSK) modulation waves are time-division-multiplexed, said BS digital broadcasting receiver comprising:

a first demodulator circuit having a first carrier regenerating circuit for regenerating a carrier for demodulation based on a phase error in demodulation data of a BPSK modulation section;

carrier to noise ratio (CNR) operation means for, when the carrier regenerated by the first carrier regenerating circuit is in a locked state, acquiring a CNR from distribution of receiving points of the demodulation data outputted from the first demodulator circuit;

a second demodulator circuit having a second carrier regenerating circuit for, in the case where the CNR is a first predetermined value or more, regenerating a carrier for demodulation based on a phase error in the demodulation data of the BPSK, QPSK, and 8PSK modulation sections, and in the case where the CNR is less than the first predetermined value, regenerating a carrier for demodulation based on a phase error in the demodulation data of the BPSK and QPSK modulation sections; and a selector for, in the case where the CNR acquired by operation is a second predetermined value or more, when a lock of the carrier regenerated by the first carrier regenerating circuit is maintained and the carrier regenerated by the second carrier regenerating circuit is in a locked state, selecting the demodulation data of the 8PSK modulation section outputted from the second demodulator circuit and selecting the demodulation data of the BPSK and QPSK modulation sections outputted from the first demodulator circuit, and in the case where the CNR acquired by operation is less than the second predetermined value, when a lock of the carrier regenerated by the first carrier regenerating circuit is maintained and the carrier regenerated by the second carrier regenerating circuit is in a locked state, selecting the demodulation data of the QPSK modulation section outputted from the second demodulator circuit and selecting the demodulation data of the BPSK modulation section outputted from the first demodulator circuit to output the selected data.

5. The BS digital broadcasting receiver according to any one of claims 1 to 4, further comprising:

copy means for, in the case where the carrier regenerated by the second carrier regenerating circuit is not locked, copying output from a loop filter in the first carrier regenerating circuit when the carrier regenerated by the first carrier regenerating circuit is in a locked state to output from the loop filter in the second carrier regenerating circuit.

6. A broadcast satellite (BS) digital broadcasting receiver for receiving digital signals wherein a plurality of poliphase phase shift keying (PSK) modulation waves having different numbers of phases are time-division-multiplexed, said BS digital broadcasting receiver comprising:

first demodulation means having a first carrier regenerating apparatus for regenerating a carrier for demodulation based on a phase error in demodulation data of a section of PSK modulation waves having the smallest number of phases out of the plurality of poliphase PSK modulation waves;

second demodulation means having a second carrier regenerating apparatus for regenerating a carrier for demodulation based on a phase error in demodulation data of PSK modulation waves of the entire number of phases of the plurality of poliphase PSK modulation waves;

determination means for determining whether or not each carrier regenerated by the first and second regenerating apparatuses is locked; and selector means for, based on determination results of the determination means, selecting and outputting either the demodulation data outputted from the first demodulation means or the demodulation data outputted from the first demodulation means.

7. The BS digital broadcasting receiver according to claim 6, wherein, when it is determined by the determination means that the lock of the carrier regenerated by the first carrier regenerating apparatus is maintained and the carrier regenerated by the second carrier regenerating apparatus is in a locked state, the selector means operates to select the demodulation data of the section of the BS modulation waves having relatively many phases outputted from the second demodulation means and to select the demodulation data of the section of the PSK modulation waves having relatively few phases outputted from the first demodulation means to output the data.

8. The BS digital broadcasting receiver according to claim 6 or 7, wherein the plurality of poliphase PSK modulation waves include the BPSK, QPSK and 8PSK modulation sections.

9. The BS digital broadcasting receiver according to claim 8, wherein the first carrier regenerating apparatus operates to regenerate the carrier for demodulation based on the phase error in demodulation data of a BPSK modulation section, and the second carrier regenerating apparatus operates to regenerate the carrier for demodulation based on the phase error in demodulation data of the BPSK, QPSK and 8PSK modulation sections, and the selector means operates to select the demodulation data of the 8PSK modulation section outputted from the second demodulation means and to select the demodulation data of the BPSK and QPSK modulation sections outputted from the first demodulation means to output the selected data.

10. The BS digital broadcasting receiver according to claim 8, further comprising CNR operation means for, when the carrier regenerated by the first carrier regenerating apparatus is in a locked state, acquiring a CNR from distribution of receiving points of the demodulation data outputted from the first demodulation means, wherein the first carrier regenerating apparatus operates to regenerate the carrier for demodulation based on the phase error in demodulation data of a BPSK modulation section, and the second carrier regenerating apparatus operates, in the case where the CNR is a first predetermined value or more, to regenerate the carrier for demodulation based on the phase error in the demodulation data of the BPSK, QPSK and 8PSK modulation section, and the selector means operates, in the case where the CNR acquired by operation is a second predetermined value or more, to select the demodulation data of the 8PSK modulation section outputted from the second demodulation means and to select the demodulation data of the BPSK and QPSK modulation sections outputted from the first demodulation means to output the selected data.

11. The BS digital broadcasting receiver according to claim 8, further comprising CNR operation means for, when the carrier regenerated by the first carrier regenerating apparatus is in a locked state, acquiring the CNR from distribution of receiving points of the demodulation data outputted from the first demodulation means, wherein the first carrier regenerating apparatus operates to regenerate the carrier for demodulation based on the phase error in demodulation data of the BPSK modulation section, and the second carrier regenerating apparatus operates, in the case where the CNR is less than a first predetermined value, to regenerate the carrier for demodulation based on the phase error in demodulation data of the BPSK and QPSK modulation sections, and the selector means operates, in the case where the CNR acquired by operation is less than a second predetermined value, to select the demodulation data of the QPSK modulation section outputted from the second demodulation means and to select the demodulation data of the BPSK modulation section outputted from the first demodulation means to output the selected data.

12. The BS digital broadcasting receiver according to claim 8, further comprising CNR operation means for, when the carrier regenerated by the first carrier regenerating apparatus is in a locked state, acquiring the CNR from distribution of receiving points of the demodulation data outputted from the first demodulation means, wherein the first carrier regenerating apparatus operates to regenerate the carrier for demodulation based on the phase error in demodulation data of the BPSK modulation section, and the second carrier regenerating apparatus operates, in the case where the CNR is a first predetermined value or more, to regenerate the carrier for demodulation based on the phase error in demodulation data of the BPSK, QPSK and 8PSK modulation sections, and in the case where the CNR is less than the first predetermined value, to regenerate the carrier for demodulation based on the phase error in demodulation data of the BPSK and QPSK modulation sections, and the selector means operates, in the case where the CNR acquired by operation is a second predetermined value or more, to select the demodulation data of the 8PSK modulation section outputted from the second demodulation means and select the demodulation data of the BPSK and QPSK modulation sections outputted from the first demodulation means, and in the case where the CNR acquired by operation is less than the second predetermined value, to select the demodulation data of the QPSK modulation section outputted from the second demodulation means and to select the demodulation data of the BPSK modulation section outputted from thle first demodulation means to output the selected data.

13. The BS digital broadcasting receiver according to any one of claims 6, 7 and 9–12, further comprising copy means for, in the case where the carrier regenerated by the second carrier regenerating apparatus is not locked, copying output from a loop filter in the first carrier regenerating apparatus when the carrier regenerated by the first carrier regenerating apparatus is in a locked state to output from the loop filter in the second carrier regenerating apparatus.

14. The BS digital broadcasting receiver according to any one of claims 6, 7 and 9–12,
wherein the determination means operates to output a lock signal for representing that the regenerated carrier of each demodulation means enter a lock range, based on the demodulation data from the first and second demodulation means and modulation system identifying signals.

* * * * *